United States Patent
Lee

(10) Patent No.: US 8,851,720 B2
(45) Date of Patent: Oct. 7, 2014

(54) ILLUMINATOR OF DOOR OUTSIDE HANDLE FOR VEHICLE

(75) Inventor: Jae Kyu Lee, Gunpo-si (KR)

(73) Assignee: Hyundai Motor Company, Seoul (KP)

( * ) Notice: Subject to any disclaimer, the term of this patent is extended or adjusted under 35 U.S.C. 154(b) by 403 days.

(21) Appl. No.: 13/295,999

(22) Filed: Nov. 14, 2011

(65) Prior Publication Data

US 2012/0127746 A1  May 24, 2012

(30) Foreign Application Priority Data

Nov. 23, 2010 (KR) .................. 10-2010-0116624

(51) Int. Cl.
*B60Q 1/00* (2006.01)
*B60Q 1/26* (2006.01)
*E05B 17/10* (2006.01)
*E05B 85/16* (2014.01)

(52) U.S. Cl.
CPC .............. *B60Q 1/2669* (2013.01); *E05B 17/10* (2013.01); *E05B 85/16* (2013.01); *B60Q 1/2696* (2013.01)
USPC ....................................... 362/501

(58) Field of Classification Search
CPC ......... E05B 17/10; E05B 81/78; E05B 85/10; B60Q 1/2669; B60Q 3/0233; F21W 2111/08; F21Y 2101/02; Y10S 16/903; H05K 1/02; H05K 1/0215; H05K 1/0284; H05K 1/141; H05K 2201/09118; H05K 2201/10151; H05K 2201/10446; H05K 2201/10606; H05K 3/202; H05K 3/301
USPC ....................................... 362/501
See application file for complete search history.

(56) References Cited

U.S. PATENT DOCUMENTS

| | | | |
|---|---|---|---|
| 5,297,010 A | 3/1994 | Camarota et al. | |
| 6,164,805 A | 12/2000 | Hulse | |
| 6,550,103 B2 * | 4/2003 | Koops et al. ................ | 16/412 |
| 6,848,818 B2 * | 2/2005 | Huizenga .................... | 362/501 |
| 7,300,190 B2 * | 11/2007 | Nitawaki et al. ............ | 362/501 |
| 7,635,210 B2 * | 12/2009 | Metros et al. ............... | 362/501 |
| 7,819,442 B2 * | 10/2010 | Ieda et al. ................... | 292/336.3 |
| 8,333,492 B2 * | 12/2012 | Dingman et al. ............ | 362/501 |
| 2005/0047162 A1 | 3/2005 | Baek | |
| 2006/0226953 A1 * | 10/2006 | Shelley et al. .............. | 340/5.62 |
| 2007/0206388 A1 | 9/2007 | Misawa et al. | |
| 2007/0258258 A1 * | 11/2007 | Wang ........................... | 362/501 |

FOREIGN PATENT DOCUMENTS

| | | |
|---|---|---|
| JP | 2006-009352 A | 1/2006 |
| KR | 10-2006-0046898 A | 5/2006 |
| KR | 10-2009-0114666 A | 11/2009 |
| KR | 10-2010-0053864 A | 5/2010 |

* cited by examiner

*Primary Examiner* — Jong-Suk (James) Lee
*Assistant Examiner* — Alexander Garlen
(74) *Attorney, Agent, or Firm* — Morgan, Lewis & Bockius LLP

(57) ABSTRACT

An illuminator of a door outside handle for a vehicle may perform both a function of a light source and a light guiding function. The illuminator may further employ a light guide having a mood lamp function on an inner surface of the door outside handle and a top LED combined with the light guide to illuminate the outer panel together with the illuminator, making it possible to enhance a product value due to realization of various illumination effects. The illuminator of a door outside handle for a vehicle can be turned on or off through various operation logics by employing multiple different illumination methods where lights of different colors can be realized according to the operation condition, making it possible to enhance product value.

7 Claims, 8 Drawing Sheets

ILLUMINATOR OF DOOR OUTSIDE HANDLE FOR VEHICLE

CROSS-REFERENCE TO RELATED APPLICATION

The present application claims priority of Korean Patent Application Number 10-2010-0116624 filed on Nov. 23, 2010, the entire contents of which application is incorporated herein for all purposes by this reference.

BACKGROUND OF INVENTION

1. Field of Invention

The present invention relates to an illuminator of a door outside handle for a vehicle. More particularly, it relates to a technology for illuminating a door outer panel by using a light source installed within a door outside handle.

2. Description of Related Art

In general, a door handle is classified into a door outside handle and a door inside handle, which are located on the outer and inner sides of a door, respectively. A door handle is also classified into a lift-up type door handle where the entire handle is pulled up to be lifted and a grip type door handle having a hinge on one side thereof according to a manner of moving the handle.

In a door outside handle, a light source is normally installed inside a handle grip to make a handle part of a door more observable by using indirect illumination, ensuring a high quality of a vehicle.

For example, if a locking state of a door is released by using a remote key, an illuminator of a door outside handle is turned on to perform a driver greeting function, by which a locking state of the door can be released and a location of the vehicle can be made known by turning on an interior lamp and an emergency lamp, making the door outside handle observable and ensuring convenience for manipulation.

However, since the conventional illuminator of a door outside handle has a light source including a light guiding member, it is difficult to mount more than one light source including a light guiding member due to lack of a mounting space within a handle, resulting in a limit in realizing various illumination functions.

For example, as illustrated in FIG. 1, a conventional illuminator includes a Light Emitting Diode (LED) 110 irradiating light and a light guiding member, i.e. a lens 120 within a handle housing 100 of a door outside handle, so that if light is irradiated from the LED 110, the light illuminates an outer panel forming part through the lens 120.

Here, the reference numeral 130 denotes a Printed Circuit Board (PCB) and the reference numeral 140 denotes a filter.

Thus, since the lens occupies a considerable space in a narrow space within the door outside handle, only one LED can be mounted due to a lack of marginal space.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention are directed to provide an illuminator of a door outside handle for a vehicle which realizes a new type of illuminator performing both a function of a light source and a light guiding function while a conventional light guiding member is removed, making it possible to utilize a space of the door outside handle and reduce manufacturing costs due to removal of the light guiding member.

Other aspects of the present invention are directed to provide an illuminator of a door outside handle which employs a light guide having a mood lamp function on an inner surface of the door outside handle and a top LED combined with the light guide to illuminate the outer panel forming part together with the illuminator, making it possible to enhance a product value due to realization of various illumination effects.

Still other aspects of the present invention are directed to provide an illuminator of a door outside handle for a vehicle which can be turned on or off through various operation logics by employing multiple illumination methods such as two different illumination methods where lights of different colors such as two different colors can be realized according to the operation condition, making it possible to enhance product value.

In one aspect, exemplary illuminators of a door outside handle for a vehicle according to the present invention may include a case installed within a handle housing, a PCB installed at a rear end of the case, and an LED bulb supported while being electrically connected to the PCB and having a cylindrical shape, the LED bulb being configured to perform both a function of a light source and a function of guiding light through a length thereof extending from the PCB to the handle housing, wherein when light is irradiated from the LED bulb, the light directly illuminates an outer panel forming part.

In this case, exemplary illuminators may further include a top LED installed at one side of the PCB, and a light guide disposed lengthwise along an outer line contour of an inner grip of the handle housing while an end of the light guide contacts or gets close to the top LED and installed such that one side surface of the light guide is exposed at a border line between the handle housing and the grip, the light guide being configured to illuminate the light from the top LED to the outer panel forming part, whereby the outer panel forming part is illuminated by the lights of the top LED and the light guide together with the light of the LED bulb.

Accordingly, exemplary illuminators of a door outside handle for a vehicle according the present invention have the following effects.

First, since the LED bulb performs a function of a light source and a function of guiding light while a conventional light guide member is removed, a useable space can be increased due to removal of parts and manufacturing costs can be reduced.

Second, since a top LED is combined with a light guide having a mood lamp function and the illuminator is turned on or off through various operation logics, the illuminator can be made more observable and a product value can be enhanced.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
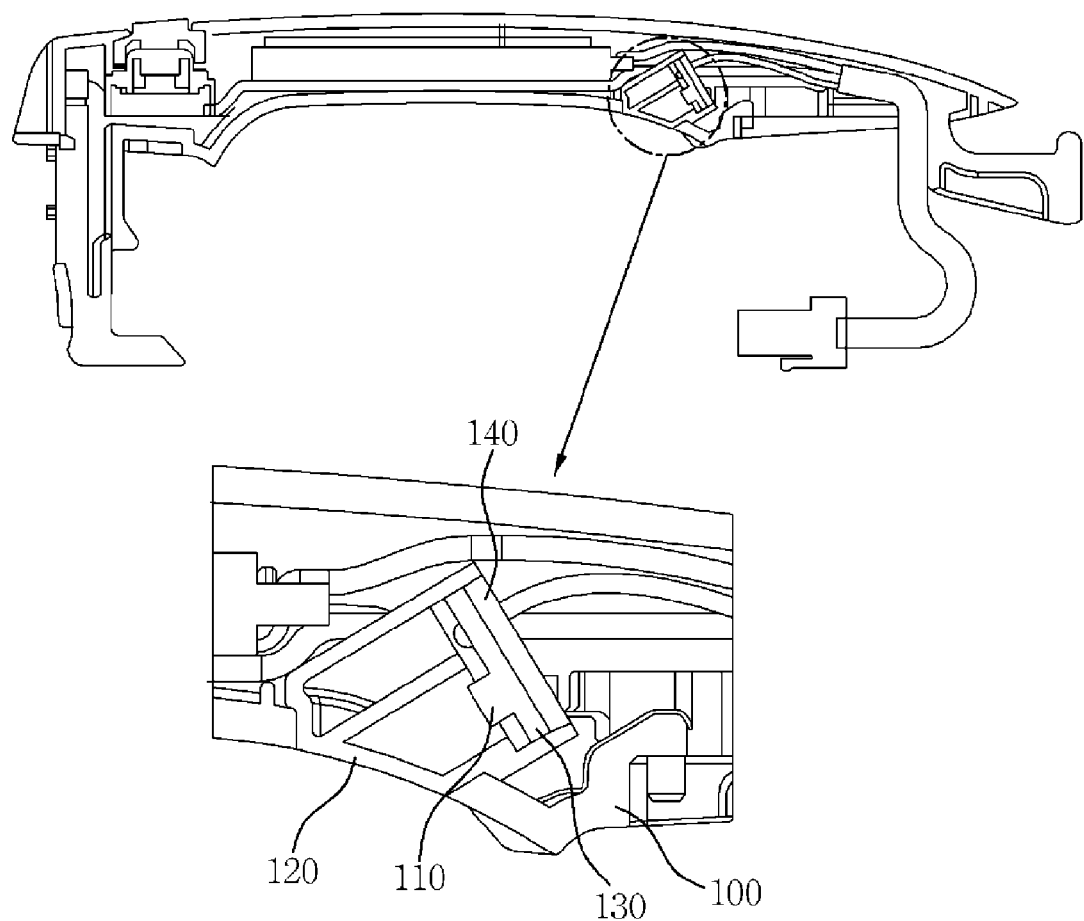
FIG. 1 is a sectional view illustrating a conventional illuminator of a door outside handle for a vehicle.
Figure 2:
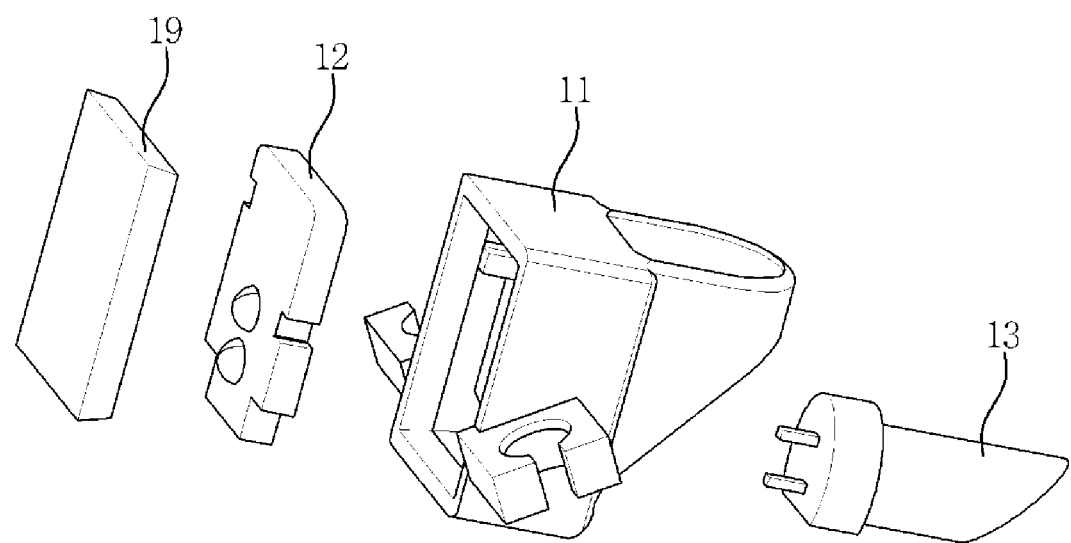
FIG. 2 is an exploded perspective view illustrating an exemplary illuminator of a door outside handle for a vehicle according to the present invention.
Figure 3:
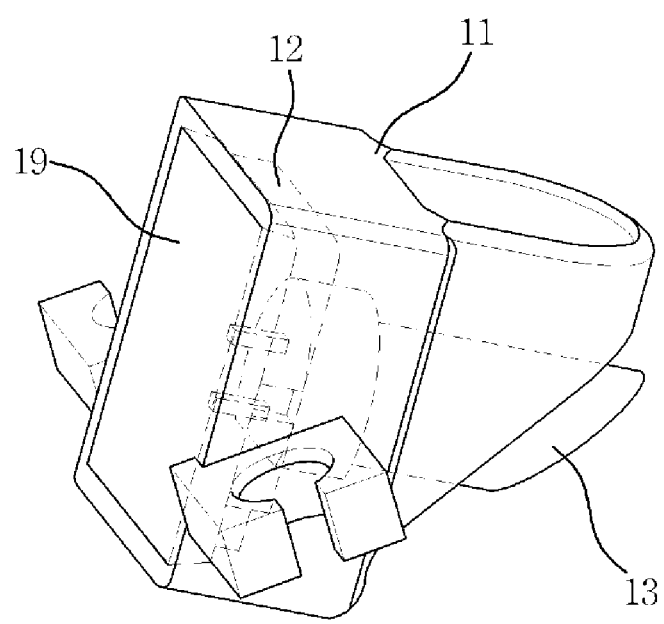
FIG. 3 is a perspective view illustrating a coupled state of the exemplary illuminator of a door outside handle for a vehicle according to the present invention.
Figure 4:
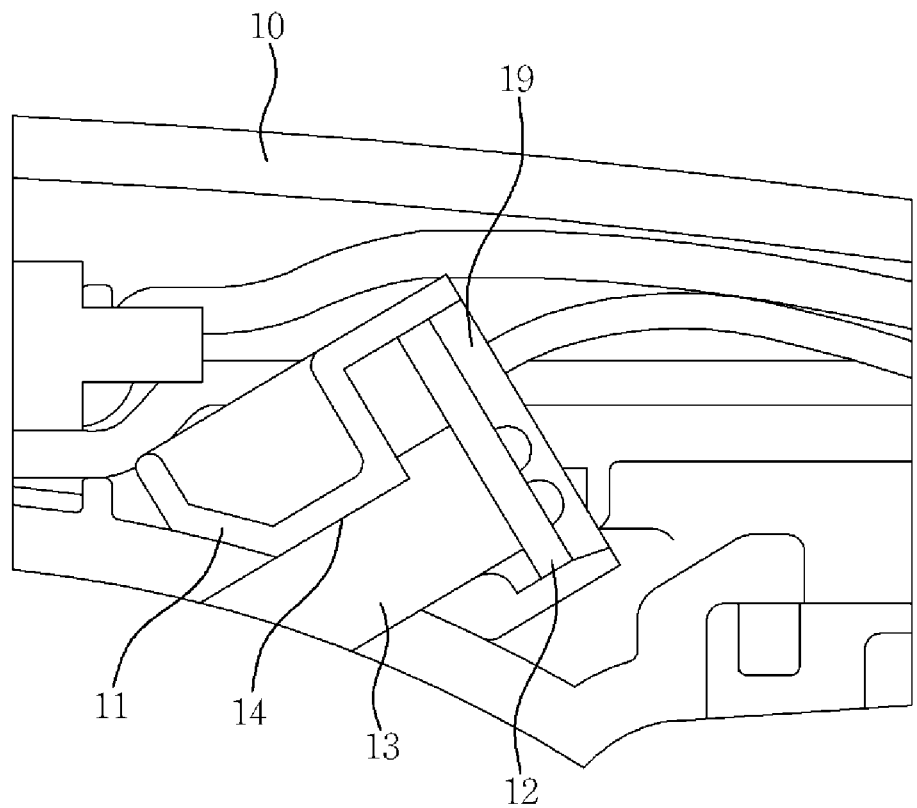
FIG. 4 is a sectional view illustrating the exemplary illuminator of a door outside handle for a vehicle according to the present invention.

FIGS. 2 to 4 illustrate an exemplary illuminator of a door outside handle for a vehicle according to the present invention.

As illustrated in FIGS. 2 to 4, the illuminator includes a light source such as an LED bulb 13 which directly emits light to illuminate the light to an outer panel forming part, without employing a light guiding member.

To achieve this, a case 11 is installed at an inner side of a handle housing 10, e.g., at an inner side of the handle housing 10 contacting a hinge part of a handle by using a screw-coupling structure. A PCB 12 connected to a cable for supplying electric power and a filter 19 for removing noise are sequentially installed at an inner rear end of the case 11 to overlap each other. The LED bulb 13 electrically connected to the PCB 12 is installed on a front surface of the PCB 12.

In this case, the LED bulb 13 performs both a function of a light source and a function of guiding light and has a substantially cylindrical shape with a predetermined length. The LED bulb 13 extends from the PCB 12 to a surface of the handle housing 10.

The LED bulb 13 directly illuminates light to the outer panel forming part using its length extending from the PCB 12 to a surface of the handle housing 10, i.e. a surface of a grip 16.

In this case, a section of an end of the LED bulb 13 is preferably curved to match with a surface line of the grip 16 which is also curved.

In particular, a peripheral surface of the LED bulb 13 is inserted within and supported by a guide aperture 14 formed in the case 11. An end, i.e. a section of the end of the LED bulb 13 extends to the grip 16 forming an inner surface of the handle housing 10 to be exposed to the outside while being supported within the guide aperture 14.

In this case, the LED bulb 13 may emit two lights, e.g., a white light and an orange light respectively. But the LED bulb 13 is not limited to emit two lights. Instead, it can emit more than two different color lights, for example, a white light, an orange light, and a green light.

Figure 5:
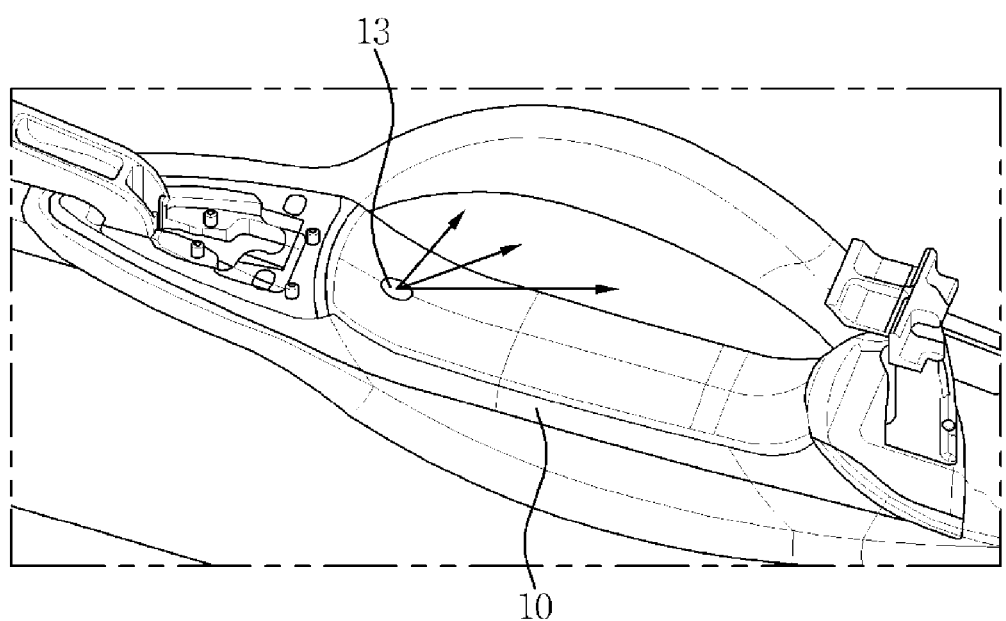
FIG. 5 is a perspective view illustrating an in-use state of the exemplary illuminator of a door outside handle according to the present invention.

FIG. 5 illustrates an in-use state of the illuminator of a door outside handle according to various embodiments of the present invention.

As illustrated in FIG. 5, since the LED bulb 13 is installed at a location of an inner side of the handle housing 10 which is inclined to one side, e.g., at a location where there is no interference such as an obstruction when a driver grips a handle and the light irradiated from the LED bulb 13 directly illuminates the outer panel forming part, the handle can be made more observable, making it possible to provide the driver with convenience for manipulation of the handle.

The LED bulb 13 having both a function of a light source and a function of guiding light directly emits light and illuminates the light to the outer panel forming part, whereby a combination of the LED bulb 13 and the case having a minimum size enough to support the LED bulb 13 can realize illumination of a handle. Accordingly, the utilization of space can be increased by reducing a space occupied within the handle housing 10.

Figure 6:
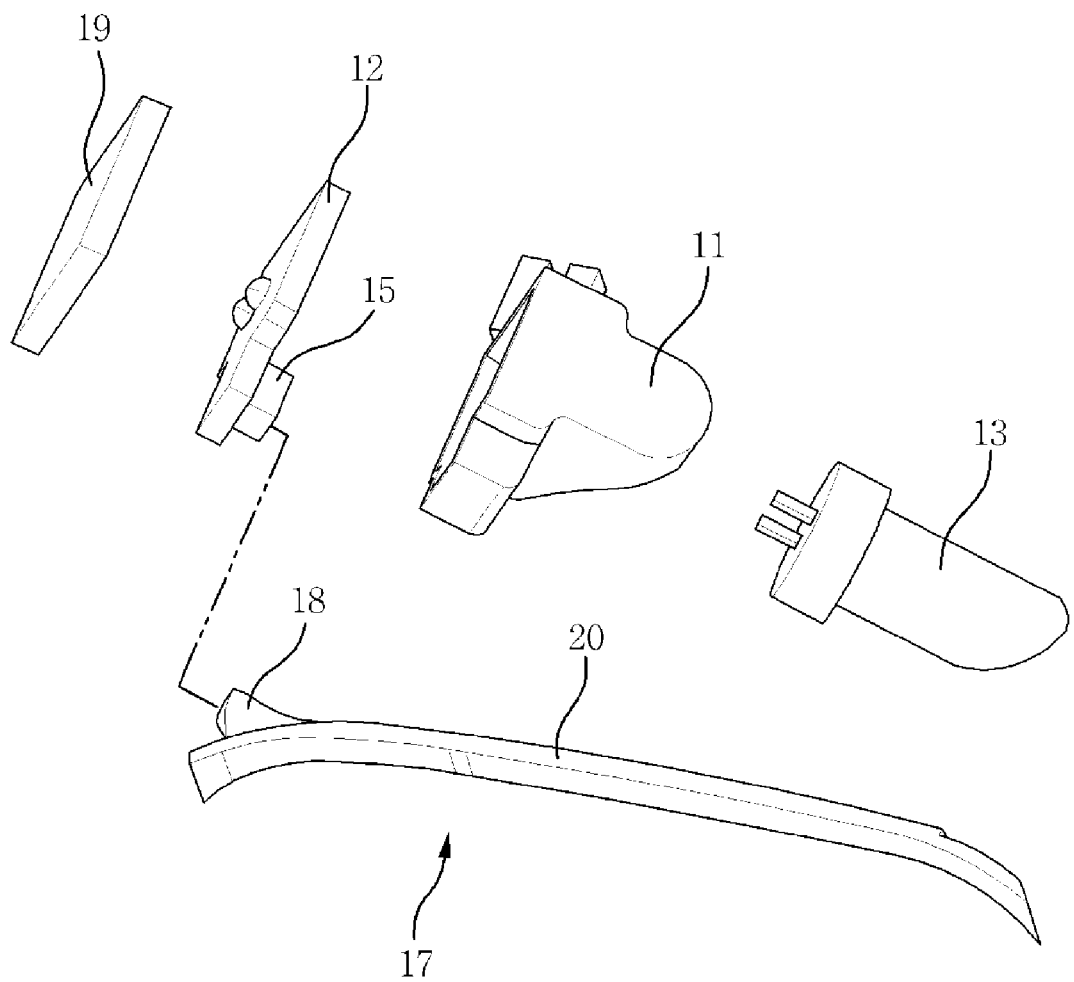
FIG. 6 is an exploded perspective view illustrating another exemplary illuminator of a door outside handle for a vehicle according to the present invention.
Figure 7:
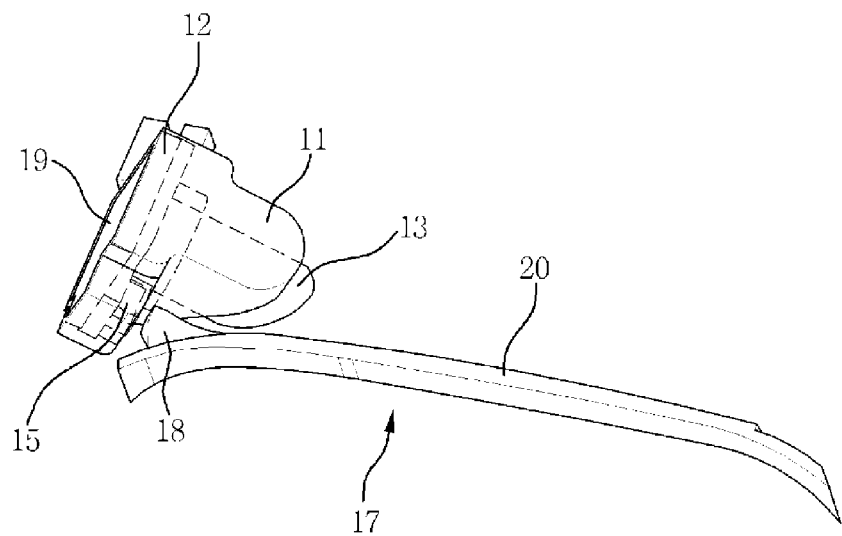
FIG. 7 is a perspective view illustrating a coupled state of the another exemplary illuminator of a door outside handle for a vehicle according to the present invention.

FIGS. 6 and 7 illustrate an illuminator of a door outside handle for a vehicle according to various embodiments of the present invention.

FIGS. 6 and 7 show an example of an illuminator where an LED bulb 13 is combined with a mood lamp light guide 17.

To achieve this, a top LED 15 acting as a light source is mounted to one side of a PCB 12 to which the LED bulb 13 is mounted and is electrically connected to the PCB 12. A light guide 17 having a long bar-like shape and opposite ends of which are smoothly curved is disposed on a front side of the top LED 15.

In this case, the light guide 17 is a type of a light guide member, and has a function of transmitting the light of the top LED 15 and illuminating an outer panel forming part.

Figure 8:
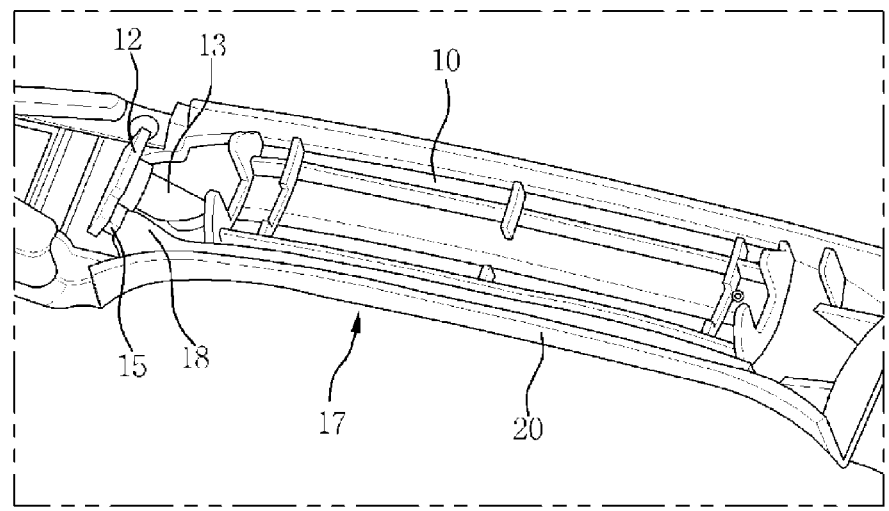
FIG. 8 is a perspective view illustrating an installed state of the another exemplary illuminator of a door outside handle for a vehicle according to the present invention.

As illustrated in FIG. 8, the light guide 17 is disposed long along an outer line contour of an inner grip 16 of the handle housing 10 while an end of the light guide 17 contacts the top LED 15, such that one side surface of the light guide 17 becomes an exposed surface 20 exposed at a border line between the handle housing 10 and the grip 16.

The light guide 17 includes an LED introducing part 18 protruding from a rear side thereof at one end thereof contacting the top LED 15. Then, the LED introducing part 18 directly contacts or gets close to the top LED 15, to guide the light of the top LED 15 along a lengthwise direction of the light guide 17.

In this case, preferably, the LED bulb 13 emits a light in one color such as a white light and the top LED 15 emits a light in another color such as an orange light.

Figure 9:
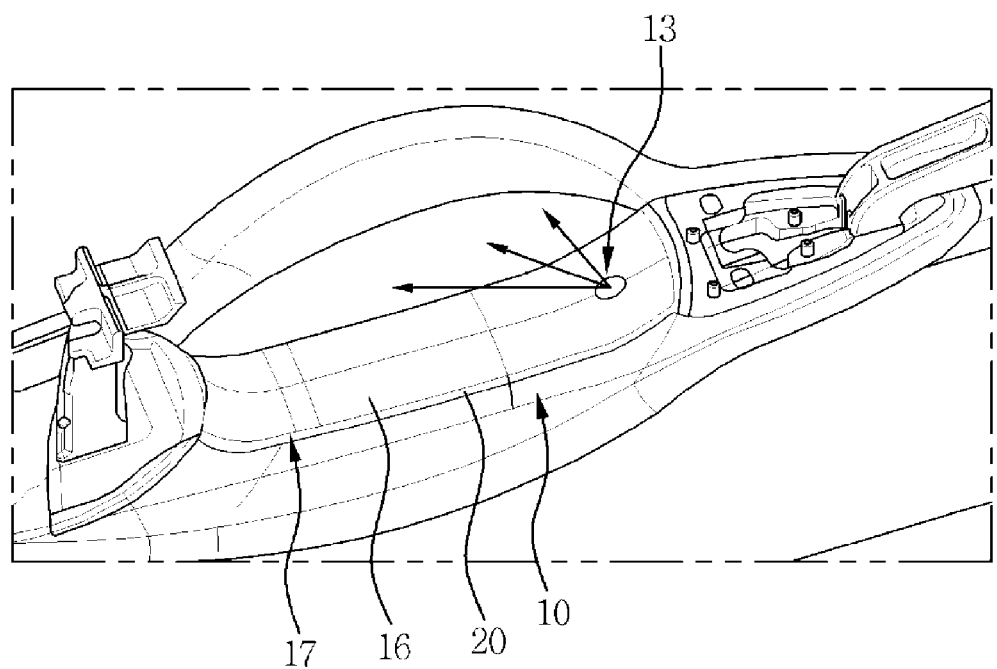
FIG. 9 is a perspective view illustrating an in-use state of the another exemplary illuminator of a door outside handle for a vehicle according to the present invention.

FIG. 9 illustrates an in-use state of the illuminator of a door outside handle for a vehicle according to various embodiments of the present invention.

As illustrated in FIG. 9, since the LED bulb 13 is installed at a location of an inner side of the handle housing 10 which is inclined to one side, and an exposed surface 20 of the light guide 17 is disposed along a border line between the handle housing 10 and the grip 16. Then, since the light directly irradiated from the LED bulb 13 and the light emitted by the top LED 15 and irradiated through the exposed surface 20 of the light guide 17 via the light guide 17 illuminate the outer panel forming part, the handle can be made more observable, making it possible to provide the driver with convenience for manipulation of the handle.

Meanwhile, the present invention provides two types of illumination methods where only the LED bulb 13 or both the LED bulb 13 and the top LED 15 emit lights having different colors such as two different colors according to the operation condition.

For example, the LED bulb 13 and the top LED 15 may emit lights having different colors. That is, the LED bulb 13 may emit a white light and the top LED 15 may emit an orange light, such that the LED bulb 13 is turned on first when an unlocking operation is performed through a remote controller and the top LED 15 is turned off when a locking operation is performed through the remote controller while a holder of the remote controller approaches a vehicle within a radius of approximately 0.7 to 1 m.

As another example, the LED bulb 13 emits lights of two different colors, such as white and orange, such that the LED bulb 13 is turned on first when an unlocking operation is performed through a remote controller and the top LED 15 is turned off when a locking operation is performed through the remote controller while a holder of the remote controller approaches a vehicle within a radius of approximately 0.7 to 1 m.

According to an illuminator of a door outside handle for a vehicle of the present invention, a light guiding member can be removed, contributing to reduction of manufacturing costs. Further, various operating logics can be realized as compared with a conventional illumination method and a mood lamp function can be added to an upper portion of a handle, contributing to improvement of a product value.

For convenience in explanation and accurate definition in the appended claims, the terms inner or outer, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An illuminator of a door outside handle for a vehicle, comprising:
    a case installed within a handle housing mounted on an outer panel;
    a Printed Circuit Board (PCB) installed at a rear end of the case;
    a Light Emitting Diode (LED) bulb that is mounted on the handle housing, located on an opposite side of the outer panel, supported while being electrically connected to the PCB, and has a substantially cylindrical shape, wherein the LED bulb is configured to perform both a function of a light source and a function of a guiding light through a length thereof extending from the PCB to a surface of the handle housing, and wherein, when a light is irradiated from the LED bulb, the light directly illuminates the outer panel;
    a top LED installed at one side of the PCB and electrically connected to the PCB; and
    a light guide disposed lengthwise along an outer line contour of an inner grip of the handle housing,
    wherein an end of the light guide contacts or gets close to the top LED, and the light guide is configured to have one side surface thereof exposed at a border line between the handle housing and the inner grip and to illuminate a light from the top LED to the outer panel.

2. The illuminator of claim 1, wherein the LED bulb is inserted within and supported by a guide aperture formed in the case and an end of the LED bulb extends to the surface of the handle housing.

3. The illuminator of claim 1, wherein the light guide includes an LED introducing part protruding from a rear side thereof at one end thereof contacting the top LED so that the light guide contacts the top LED using the LED introducing part.

4. The illuminator of claim 1, wherein the LED bulb and the top LED emit lights of different colors such that the LED bulb is turned on first when an unlocking operation is performed through a remote controller and the top LED is turned off when a locking operation is performed through the remote controller while the remote controller is within a radius of approximately 0.7 to 1 m of a vehicle.

5. The illuminator of claim 4, wherein the LED bulb emits a white light and the top LED emits an orange light.

6. The illuminator of claim 1, wherein the LED bulb emits lights of different colors.

7. The illuminator of claim 6, wherein the LED bulb emits a white light and an orange light.

* * * * *